United States Patent
Hsu

(10) Patent No.: US 9,348,160 B2
(45) Date of Patent: May 24, 2016

(54) DISPLAY BACKLIGHTS WITH ADJUSTABLE NARROW VIEWING ANGLE

(75) Inventor: Feng-Hsiung Hsu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 12/822,648

(22) Filed: Jun. 24, 2010

(65) Prior Publication Data

US 2011/0317399 A1    Dec. 29, 2011

(51) Int. Cl.
*G09F 13/08* (2006.01)
*G02F 1/133* (2006.01)
*G02F 1/13* (2006.01)
*G02F 1/1335* (2006.01)

(52) U.S. Cl.
CPC .............. *G02F 1/133* (2013.01); *G02F 1/1323* (2013.01); *G02F 1/133606* (2013.01); *G02F 2001/133607* (2013.01); *G02F 2203/62* (2013.01)

(58) Field of Classification Search
CPC ........................... H05B 41/2851; F21L 14/026
USPC .......................................................... 348/58
See application file for complete search history.

(56) References Cited

U.S. PATENT DOCUMENTS

| | | | |
|---|---|---|---|
| 5,008,658 A | 4/1991 | Russay et al. | |
| 5,200,913 A | 4/1993 | Hawkins et al. | |
| 5,877,829 A * | 3/1999 | Okamoto et al. | 349/74 |
| 6,398,370 B1 | 6/2002 | Chiu et al. | |
| 6,529,182 B1 | 3/2003 | Burton | |
| 6,534,926 B1 * | 3/2003 | Miller et al. | 315/224 |
| 7,009,665 B2 | 3/2006 | Li et al. | |

(Continued)

FOREIGN PATENT DOCUMENTS

| | | |
|---|---|---|
| GB | 2432688 A1 | 5/2007 |
| WO | 0107999 A1 | 2/2001 |

OTHER PUBLICATIONS

Chen, et al., "Navigation Techniques for Dual-Display E-Book Readers", Retrieved at <<http://citeseerx.ist.psu.edu/viewdoc/download?doi=10.1.1.148.1056&rep=rep1&type=pdf>>, Conference on Human Factors in Computing Systems, Proceeding of the twenty-sixth annual SIGCHI conference on Human factors in computing systems, Apr. 5-10, 2008, pp. 1779-1788.

(Continued)

*Primary Examiner* — Leron Beck
(74) *Attorney, Agent, or Firm* — Steve Wight; Sandy Swain; Micky Minhas

(57) ABSTRACT

Display components (e.g., liquid crystal displays (LCDs)) are viewable at different viewing angles, for example, by a first user positioned directly in front of the display and by a second user positioned to one side of the display. Many displays present a consistent display across a wide range of viewing angles, but these displays may consume energy and/or compromise user privacy. Presented herein are configurations of backlights for display devices featuring an adjustable viewing angle, such that a user may select a narrower viewing angle in usage scenarios involving power consumption or privacy, and may select a wider viewing angle in usage scenarios involving plentiful power and fewer privacy concerns. Such configurations may include multiple banks of backlight lamps generating backlight at different viewing angles; an electrowetting electrode as an adjustable collimator; adjustable diffusers that may adjustably scatter light passing therethrough; and/or a combination of such adjustable elements.

20 Claims, 9 Drawing Sheets

(56) References Cited

U.S. PATENT DOCUMENTS

| | | |
|---|---|---|
| 7,206,196 B2 | 4/2007 | Ghosh et al. |
| 7,301,522 B2 | 11/2007 | Ko |
| 7,301,601 B2 | 11/2007 | Lin et al. |
| 7,348,958 B2 | 3/2008 | Park |
| 7,502,221 B2 | 3/2009 | Fuller et al. |
| 2005/0231978 A1 | 10/2005 | Kvenvold et al. |
| 2006/0034039 A1 | 2/2006 | Van Rens |
| 2007/0132402 A1* | 6/2007 | Kitta et al. ............... 315/291 |
| 2007/0274093 A1 | 11/2007 | Haim et al. |
| 2009/0213147 A1* | 8/2009 | Sagardoyburu et al. ...... 345/690 |
| 2009/0256795 A1 | 10/2009 | Naum et al. |
| 2009/0303420 A1* | 12/2009 | Kim et al. .................... 349/96 |
| 2010/0014027 A1 | 1/2010 | Li et al. |
| 2010/0165660 A1* | 7/2010 | Weber et al. ................. 362/609 |

OTHER PUBLICATIONS

Xie, Karin, "Samsung Begins Producing Ultra-Slim, Energy-Efficient LCD Panels with Edge-lit LED Backlighting"—Published Date: Mar. 26, 2009, pp. 1-3 http://www.samsung.com/us/business/semiconductor/newsView.do?news_id=992.

Koskela, Tomi "LED Backlighting for LCDs Requires Unique Drivers"—Published Date: May 12, 2008, pp. 1-3, http://powerelectronics.com/power_management/led_drivers/led-backlighting-lcd-power-efficiency-0512/.

* cited by examiner

DISPLAY BACKLIGHTS WITH ADJUSTABLE NARROW VIEWING ANGLE

BACKGROUND

Within the field of electronics, many devices feature a display component that may present visual output of the device with the assistance of a backlight. For example, in a liquid crystal device (LCD), an array of liquid crystals may be electrically switched between a transparent state and a reflective or absorptive state that correspondingly transmits or blocks light emitted from a backlight positioned behind the liquid crystal array, thereby permitting the display of visual units (such as pixels) in order to present visual output. Various display configurations and backlights may confer upon the display device various features, e.g., display brightness or contrast, power conservation, color depth, high resolution or refresh rate, or visual depth associated with a three-dimensional presentation.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A particular feature of display devices that may be of relevance to various users is the viewing angle of the display device. The visual output of a display device may vary based on the angle of incidence of the viewer with the display surface; e.g., a first user positioned directly in front of the display and viewing the display at a zero-degree angle may perceive enhanced brightness, contrast, and/or color saturation than a second user positioned to the side of the display and viewing the display at a nonzero-degree angle. Many configurations of display devices seek to expand the relevant viewing angle, e.g., by achieving more consistent distribution of light passing through the liquid crystal array at various angles, in order to promote a good visual presentation of the display device across a wider range of viewing angles. However, display devices often consume a considerable share of the power utilized by the device, and promoting bright and consistent presentations of the display device at a wide range of viewing angles may increase the power consumption of the device, thereby reducing battery life.

Presented herein are several configurations of the components of a display (and, in particular, the components of backlight of the display, e.g., those behind the liquid crystal display) that may promote conservation of power and may extend battery life, as well as improve the privacy of the user, by including the capability of narrowing the viewing angle of the display device. Moreover, this narrowing may be achieved in an adjustable way, such that the user or operating system may specify a desired viewing angle based on various user preferences and details of the computing environment (e.g., the viewing angle of the backlight may be reduced in order to conserve power, or may be expanded to improve the quality of the visual presentation for users viewing the display at a nonzero angle.) Several components within the display may achieve this adjustable narrowing; e.g., an electrowetting electrode may be included to serve as an adjustable collimator that narrows or expands the orientation of light passing through the liquid crystal array based on a variable electric voltage, or several banks of backlight lamps may be included, where each bank provides light to the liquid crystal array at a different degree of directedness. The availability of an adjustable viewing angle may thereby improve the power conservation and/or privacy of the user in usage scenarios where such aspects are advantageous, while permitting a higher-quality display in other usage scenarios.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
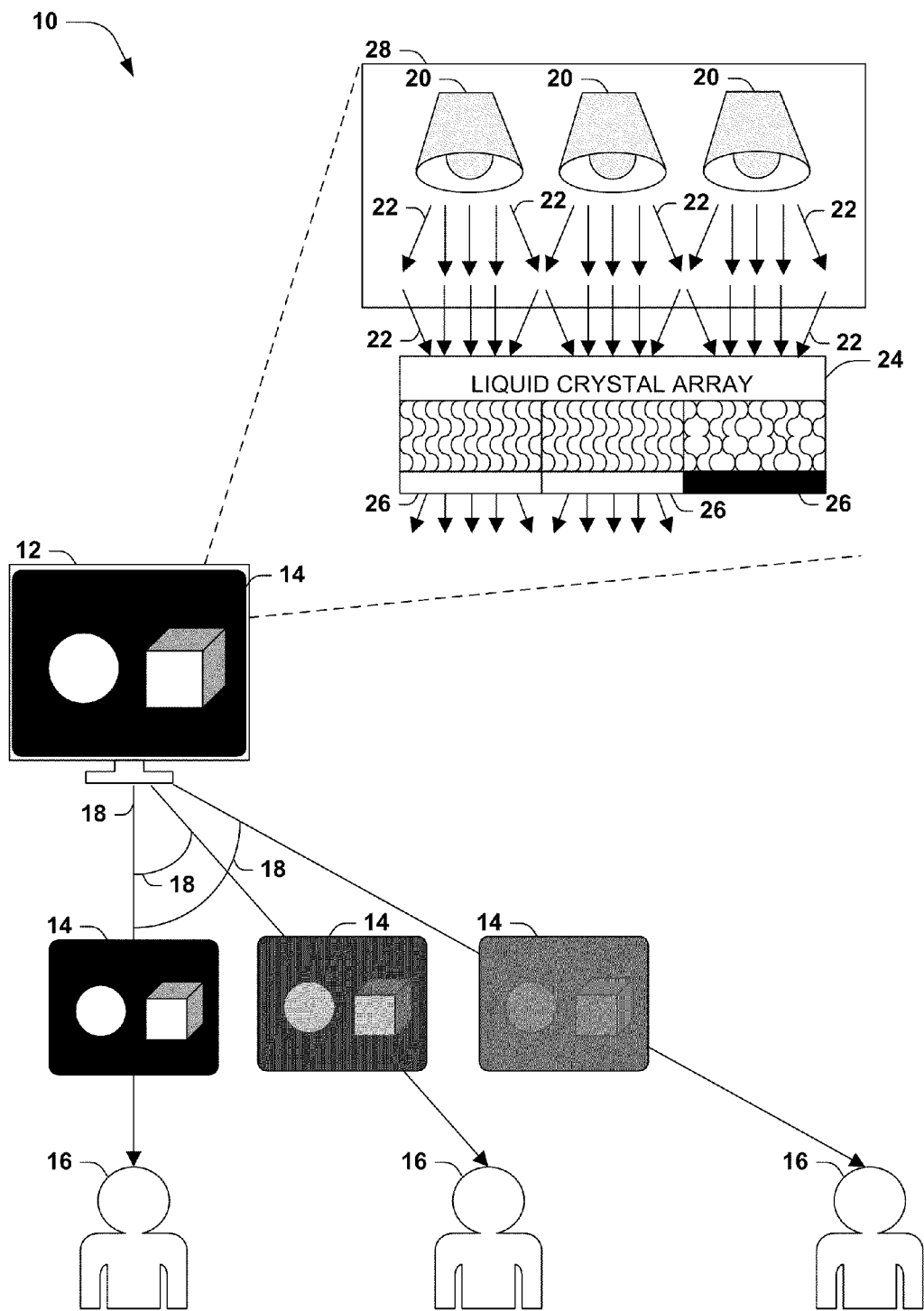
FIG. 1 is an illustration of an exemplary scenario featuring a display having a backlight and configured to render a presentation for three users viewing the display at various viewing angles.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of electronics, many devices feature a display, such as a liquid crystal display (LCD), which may render visual output of the device. Such displays may exist in many shapes, orientations, sizes, and resolutions, and may render the visual output in two-tone, grayscale, or various depths of color. Some display devices often present advanced features, such as stereoscopic or three-dimensional viewing, improved performance in bright and/or dim environments, power savings, rotatable orientations that may present the visual output in either portrait or landscape mode, and high refresh rates for such applications as gaming.

Display devices often include a backlight that is positioned to illuminate the visual elements of the display, such as an array of liquid crystals that, upon electrical activation or deactivation, transition between transparent and opaque properties in order to allow the light from the backlight to pass through the liquid crystals. Some display devices may rely on the backlight to illuminate the display, whereas other display devices may rely on ambient light, such as by positioning a reflector behind the liquid crystal array to reflect ambient light through the liquid crystal array. Hybrid "transflective" display devices may also be devised that comprise both a backlight and a reflector, thereby illuminating the liquid crystal array with both generated and ambient light. Moreover, the transflectivity of such display devices may be adjustable, e.g., by increasing the power of the backlight when ambient light is low and/or power is plentifully available to the display device, and by decreasing or terminating power to the backlight when ambient light is high and/or power is limited and advantageously conserved.

A significant property of display devices, which may involve the backlight component, is the viewable angle of the display. In many display devices, the appearance of the visual output when viewed by a user positioned directly in front of the display (e.g., at a zero-degree angle from the center of the display) may appear of high-quality, but the appearance may differ from that viewed by a user positioned to the side of the display (e.g., at a nonzero-degree angle from the center of the display.) For example, as a user positioned in line with the center of the display moves laterally, the appearance may lose brightness, contrast, color saturation, or clarity. This reduced quality often arises from the configuration of the display device, and in particular the backlight, such that the light delivered by the backlight onto the display surface (e.g., a liquid crystal array) is inconsistent, with more light being emitted directly through the display surface (at a zero-degree angle) than being emitted at an angle through the display surface (at a nonzero-degree angle.) Furthermore, the amount of light comprising the visual output may continue to diminish as the user continues to move laterally, further reducing the quality of the presentation to unviewable quality levels (e.g., visual output with such low contrast that shapes and text cannot be accurately or fully perceived.)

FIG. 1 presents an exemplary scenario 10 featuring a display 12 configured to present a visual presentation 14 to a set of users 16 positioned at various viewing angles 18 with respect to the display 12. For example, a first user 16 may be positioned directly in front of the center of the display 12, thereby having a zero-degree viewing angle 18 with respect to the display 12, while a second user 16 is positioned to one side the display 12 having a moderately nonzero-degree viewing angle 18 with respect to the display 12, and a third user 16 is positioned to one side the display 12 having a large nonzero-degree viewing angle 18 with respect to the display 12. The display 12 in this exemplary scenario 10 comprises a liquid crystal display (LCD) device, comprising a backlight 28 having one or more lamps 22 positioned to emit light 22 upon a display surface 24, in this case comprising a liquid crystal array comprising a two-dimensional matrix of areas of liquid crystals that may be separately activated with electricity and caused to align in a manner that causes transparency, whereas unactivated areas of liquid crystals are disjointed and reflect or absorb light. In this manner, the areas of the liquid crystals may be utilized to cause various display units 26 (e.g., pixels) comprising the visual presentation 14 to appear light or dark, based on whether or not the liquid crystals are activated to allow passage of the light 22 generated by the backlight 28. Moreover, various degrees of activation may be utilized to cause varying levels of transparency and brightness, and arrays of liquid crystals colored red, green, and blue may be utilized to provide a display 12 capable of presenting colored visual output 14.

In the exemplary scenario 10 of FIG. 1, the lamps 20 emit light 22 in many directions. The light 22 passing through the display surface 24 at an angle allows a user 16 positioned along the same angle to view the visual presentation 14. However, the lamps 20 often do not emit light 22 in many directions at the same brightness. For example, light 22 emitted directly toward the display surface 24 may be brighter than light 22 emitted toward the display surface 24 at a moderate angle, which may be brighter than light 22 emitted toward the display surface 24 at a steep angle. Accordingly, the first user 16, positioned at a zero-degree angle 18 with respect to the center of the display 12, may perceive the visual presentation 14 at full brightness, color saturation, and/or contrast; however, the second user 16, positioned at a moderately nonzero viewing angle 18 with respect to the center of the display 12, may perceive the visual presentation 14 with reduced quality (e.g., black colors may appear less black, light colors may appear dimmer, colors may appear less saturated, and contrast between shapes may be reduced), and the third user 16, positioned at a large nonzero viewing angle 18 with respect to the center of the display 12, may perceive the visual presentation 14 with greatly reduced quality.

The inconsistent quality of the visual presentation 14 at various viewing angles 18 is often perceived as a drawback of the display 12. For example, the users 16 in the exemplary scenario 10 of FIG. 1 may wish to view the visual presentation 14 together, such as an audience of a video shown on an LCD display, and users 16 seated at the peripheries of the viewing area may perceive a significantly lower-quality visual presentation 14 than users 16 seated in the center of the viewing area. In order to reduce this inconsistency, displays 12 may be designed in alternate ways, such as with lamps 20 that emit light 22 at consistent power in many directions, and/or diffusers positioned between the lamps 20 and the display surface 24 that redistribute the light 22 across a range of directions in order to promote the consistent quality of the visual presentation 14 at different viewing angles 18. Such components may involve additional cost and design complexity, and may consume more power, but the improved consistency of the visual presentation 14 may be considered an advantage.

However, in some scenarios, this consistency may not be advantageous, and may actually be disadvantageous, where the user 16 prefers to restrict the quality of the visual presentation 14 to a small viewing angle 18. As a first example, the user 16 may desire privacy while operating the device attached to the display 12 in public environments, and may therefore prefer that the display 12 not be easily viewable or perceived by other users 16 who are not positioned directly in front of the display 12. As a second example, it may be appreciated that the display 12 of a mobile device, and in particular the generation of light 22 by the lamps 20 of the backlight 28, often utilizes a large percentage of the power provided to the device, and that techniques for reducing the power consumption of the display 12 may improve the battery life of the device. Accordingly, it may be appreciated that restricting the viewing angle 18 of the visual presentation 14 may permit the lamps 20 to present the same visual presentation 14 at a zero-degree viewing angle 18 while operating at a lower power, since less light 22 is emitted at various nonzero viewing angles 18. Moreover, while the user 16 may prefer a restricted viewing angle 18 in some computing scenarios, at other times, the user 16 may prefer a broader viewing angle 18 (e.g., when sharing a video with other users 16 positioned at various viewing angles 18 around the display 12.) Therefore, it may be desirable to configure the display 12 to feature an adjustable viewing angle 18, which may be achieved through various configurations of the backlight 28. For example, the display 12 may adjust the visual presentation 14 to promote a narrow viewing angle 18 when the device is presenting sensitive information in a public environment and/or when the device is operating in a power-conserving mode (e.g., when disconnected from an external power source and running on a battery), and to promote a wide viewing angle 18 when the device is operated in a private environment and/or in a non-power-conserving mode (e.g., when connected to an external power source.) It may be further advantageous to configure the display 12 as adjustable across a wide range of viewing angle 18, such that the viewable angle of the visual presentation 14 may be selected among many settings according to a current preference of the user 16.

In accordance with these scenarios, presented herein are techniques for configuring a display 12 to feature an adjustable viewing angle 18. In particular, presented herein are various configurations of backlights 28 that may be incorporated in a display 12 to achieve an adjustable viewing angle of the visual presentation 14 thereof. These and similar backlights may be incorporated in many types of devices 12, and may be controlled in many ways (including, e.g., hardware processes incorporated in the display 12 and/or other components of the device, software processes executing on a processor of a device attached to the display 12, and/or a user 16 of a device.)

Figure 2:
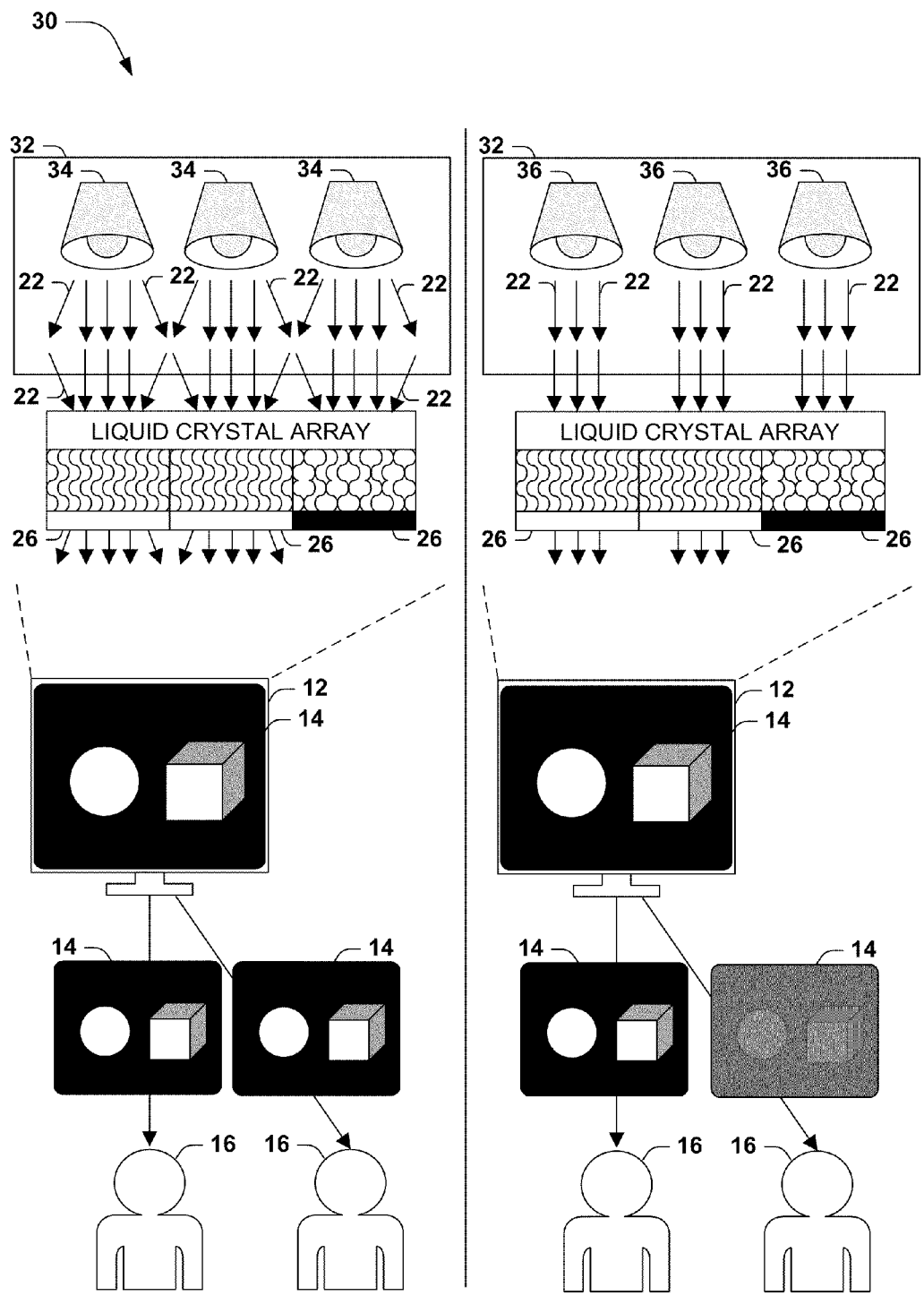
FIG. 2 is an illustration of a first exemplary backlight configured to confer an adjustable viewing angle upon a display in accordance with the techniques presented herein.

FIG. 2 presents an exemplary scenario 30 featuring a first embodiment of these techniques, wherein the adjustable viewing angle 18 of the display 12 is achieved through the inclusion in the backlight 32 of a plurality of lamps of different types. In particular, the backlight 32 may include at least two types of lamps, such as one or more wide-beam lamps 34 and one or more narrow-beam lamps 36. In a first state (illustrated in the left half of FIG. 2), the wide-beam lamps 34 of the backlight 32 are powered, and emit light 22 in many angles. The light 22 may therefore pass through the display surface 22 at many angles, and may achieve a wide range of viewing angles 18 (such that a first user 16 positioned at a zero-degree viewing angle 18 with respect to the center of the display 12 perceives the visual presentation 14 of similar quality to a second user 16 positioned at a nonzero-degree viewing angle 18 with respect to the center of the display 12.) By contrast, in a second state (illustrated in the right half of FIG. 2), the narrow-beam lamps 36 of the backlight 32 are powered, and emit light 22 predominantly directed toward the display surface 24. The light 22 may therefore pass through the display surface 22 predominantly at a zero-degree angle, and may achieve a narrow range of viewing angles 18 (such that a first user 16 positioned at a zero-degree viewing angle 18 with respect to the center of the display 12 perceives the visual presentation 14 of significantly higher quality than a second user 16 positioned at a nonzero-degree viewing angle 18 with respect to the center of the display 12.) This second mode may be advantageous, e.g., for preserving the privacy of the first user 16 by degrading the visual presentation 14 for other users 16 not positioned directly in front of the display 12, and/or for conserving power by consolidating the light 22 emitted by the backlight 32 to a small range of viewing angles 18, thereby permitting the backlight 32 to achieve a similar quality of visual presentation 14 for the first user 16 positioned directly in front of the display 12 while powering the backlight 32 at a lower power to conserve battery life.

Figure 3:
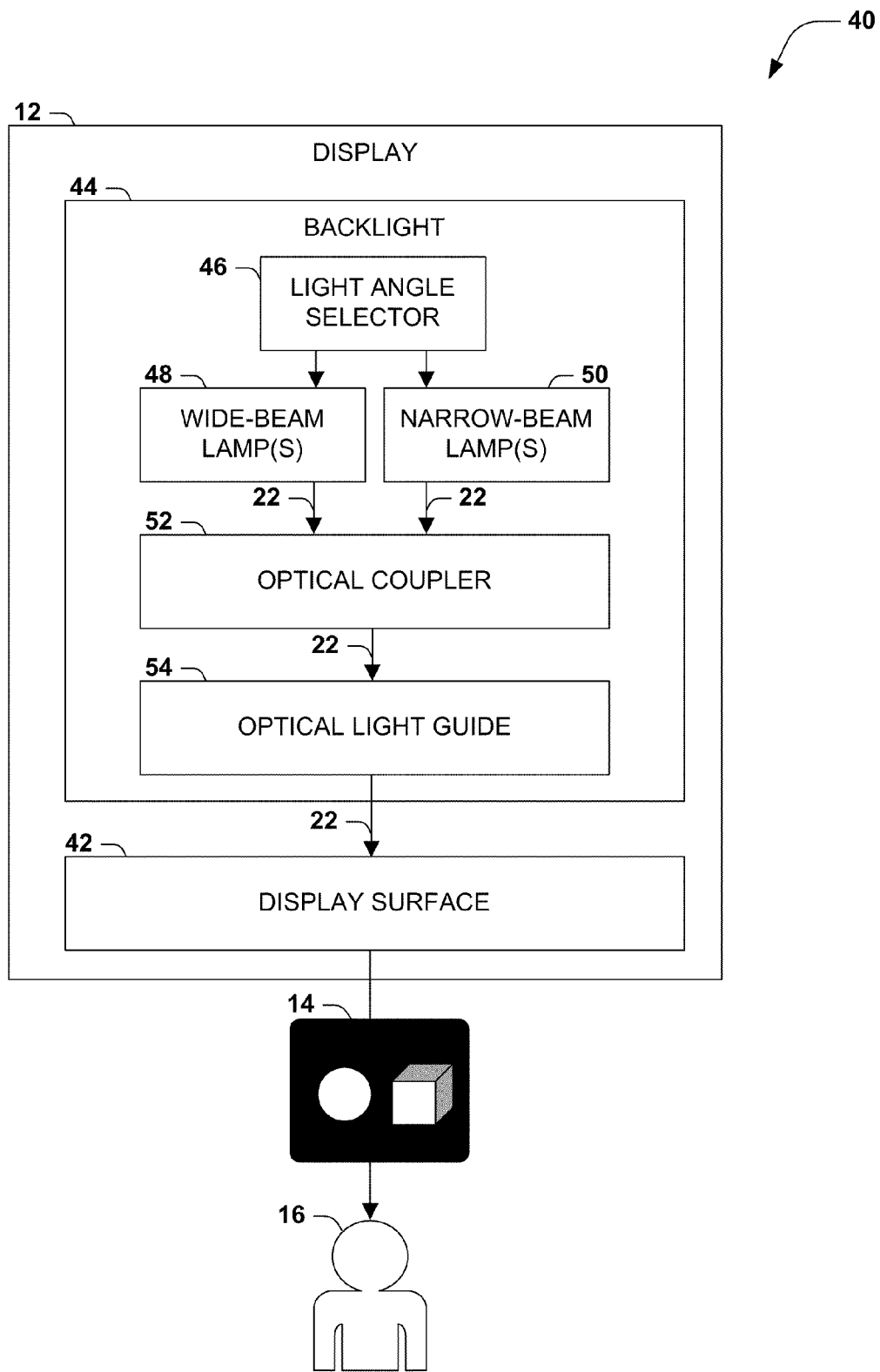
FIG. 3 is a component block diagram of the first exemplary backlight illustrated in FIG. 2.

FIG. 3 presents a component block diagram 40 of the exemplary first embodiment of these techniques illustrated in FIG. 2. In this component block diagram 40, the exemplary first embodiment comprises a backlight 44 operating within a display 12 having a display surface 42, in order to produce a visual presentation 14 to be rendered for at least one user 16. The backlight 44 comprises at least one wide-beam lamp 48 configured to emit light 22 at a wide angle, and at least one narrow-beam lamp 50 configured to emit light 22 at a narrow angle directed toward the display surface 42. The backlight 44 also comprises a light angle selector 46, which is configured to activate one of the at least one wide-beam lamp 48 and the at least one narrow-beam lamp 50. The backlight 44 also comprises an optical coupler 52, which is positioned between at least one lamp and the display surface 42 and is configured to couple the light 22 with the display surface 42 (e.g., by reducing the transitions between media that may cause undesirable diffraction of the light 22), and an optical light guide 54, which is positioned between at least one lamp and the display surface 42 and which is configured to distribute the light 22 across the display surface 54. This configuration of the backlight 44 thereby achieves the emission and guidance of light 22 toward the display surface 42 with a variable viewing angle 18, based on the selection and activation of the wide-beam lamps 48 and/or the narrow-beam lamps 50.

Several variations of this first embodiment may be devised. As a first example, the various lamps may be deployed within the backlight 32 in many ways (e.g., as an alternating array of lamps having different properties, or as a bank of wide-beam lamps 48 positioned along a first edge of the backlight 32 and a bank of narrow-beam lamps 50 positioned along a second edge of the backlight 32.) As a second example, the wide-beam lamps 48 and/or the narrow-beam lamps 50 may both be activated, either with equal power or with different power, in order to adjust the visual presentation 14 for a moderate viewing angle 18 that is greater than the narrow viewing angle 18 achieved by powering only the narrow-beam lamps 50 and less than the wide viewing angle 18 achieved by powering only the wide-beam lamps 48. A similar effect may be achieved by powering only some of the wide-angle lamps 48 and/or the narrow-beam lamps 50 and leaving some lamps of either bank unpowered. As a third example, more than two banks of lamps may be incorporated; e.g., the backlight 44 may comprise at least one moderate-beam lamp configured to emit light at an angle less than the wide angle of the wide-beam lamp 48 and greater than the narrow angle of the narrow-beam lamp 50, and may be activated by the light angle selector 46 to activate one or more of the wide-beam lamps 48, the moderate-beam lamps, and the narrow-beam lamps 50. Those of ordinary skill in the art may devise many variations of the first embodiment of these techniques illustrated in FIGS. 2 and 3.

Other embodiments of the techniques presented herein may achieve an adjustable viewing angle 18 through the inclusion of one or more collimators and/or diffusers. A collimator may be positioned between one or more lamps and the display surface 24 to align, narrow, and/or focus the direction of the light 22 in a particular direction (e.g., toward the display surface 24), whereas a diffuser may be positioned between one or more lamps and the display surface 24 in order to distribute the light 22 across a wider angle across the display surface 24. As one example, the optical light guide 54 may comprise a film of optical plastic, which may have a thickness of a millimeter or less. Light entering the optical light guide 54 may be captured through total internal reflection, but may be extracted through the use of a sheet of prisms with tips that contact the surface of the optical light guide 54, thereby providing an extraction of light from within the optical light guide 54 at the locations whereby the prisms contact the surface thereof. The prisms may also serve as a collimator of the transmitted light, e.g., by including a lens focused at the tip of each prism to provide a focusing effect.

While components such as collimators may be utilized in many types of displays 22, the light focusing and/or distributing properties of such components are often not adjustable, and therefore such conventional displays cannot adjust the viewing angles 18 of the visual presentation 14 achieved by the display. By contrast, in some embodiments of these techniques, an adjustable collimator and/or an adjustable diffuser may be included to enable an adjustable viewing angle 18.

Figure 4:
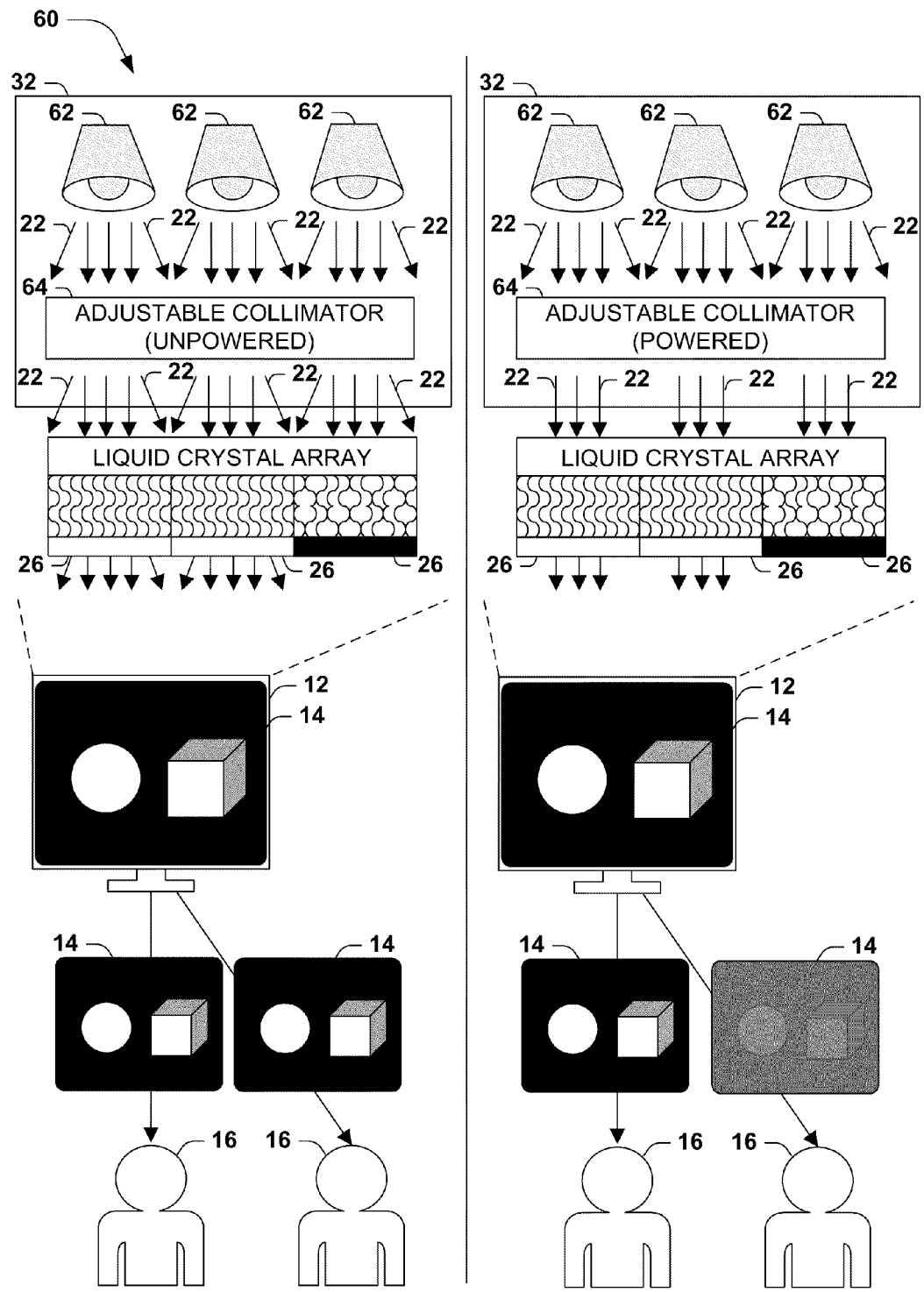
FIG. 4 is an illustration of a second exemplary backlight configured to confer an adjustable viewing angle upon a display in accordance with the techniques presented herein.

FIG. 4 presents an exemplary scenario 60 featuring a second embodiment of these techniques, featuring a backlight 32 including a set of lamps 62 that may be powered to distribute light 22 at many angles toward the display surface 24. The viewing angle 18 of the display 12 may be rendered adjustable in this second embodiment through the inclusion in the backlight 32 of an adjustable collimator 64. The adjustable collimator 64 comprise, e.g., an electrowetting electrode, such as a hydrophobic substance (such as mercury) positioned along the path of a beam of light 22 that ordinarily does not affect the light 22, but that responds to electrical activation to generate a collimating effect upon the light 22. In particular, the electrowetting electrode may provide an adjustable collimation angle proportional to an electrowetting voltage applied to the electrowetting electrode. In a first state of this embodiment (illustrated in the left half of FIG. 4), the adjustable collimator 64, positioned along the path of light 22 between the lamps 62 and the display surface 24, is unpowered, and the angles of the light 22 passing therethrough is not affected. The embodiment in this state may achieve a wide range of viewing angles 18 (such that a first user 16 positioned at a zero-degree viewing angle 18 with respect to the center of the display 12 perceives the visual presentation 14 of similar quality to a second user 16 positioned at a nonzero-degree viewing angle 18 with respect to the center of the display 12.) By contrast, in a second state (illustrated in the right half of FIG. 4), the adjustable collimator 64 is powered and applies to the light 22 a collimating effect that narrows and/or focuses the light 22 upon the display surface 24. The light 22 may therefore pass through the display surface 22 predominantly at a zero-degree angle, and may achieve a narrow range of viewing angles 18 (such that a first user 16 positioned at a zero-degree viewing angle 18 with respect to the center of the display 12 perceives the visual presentation 14 of significantly higher quality than a second user 16 positioned at a nonzero-degree viewing angle 18 with respect to the center of the display 12.)

Figure 5:
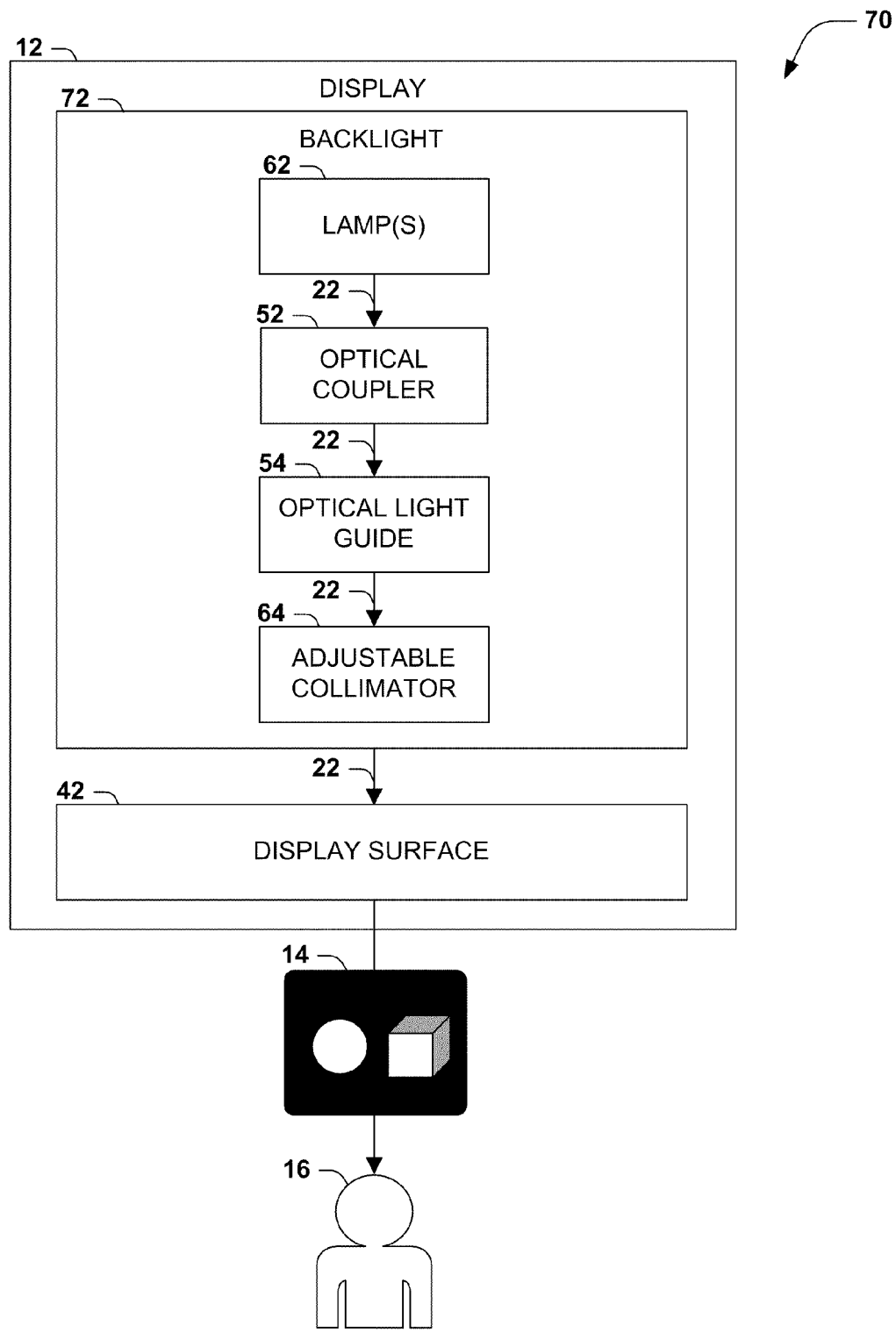
FIG. 5 is a component block diagram of the second exemplary backlight illustrated in FIG. 4.

FIG. 5 presents a component block diagram 70 of the exemplary second embodiment of these techniques illustrated in FIG. 4. In this component block diagram 70, the exemplary second embodiment comprises a backlight 72 operating within a display 12 having a display surface 42, in order to produce a visual presentation 14 to be rendered for at least one user 16. The backlight 72 comprises at least one lamp 62 configured to emit light 22 at many angles directed toward the display surface 42. The backlight 72 also comprises an optical coupler 52, which is positioned between at least one lamp and the display surface 42 and is configured to couple the light 22 with the display surface 42 (e.g., by reducing the transitions between media that may cause undesirable diffraction of the light 22), and an optical light guide 54, which is positioned between at least one lamp and the display surface 42 and which is configured to distribute the light 22 across the display surface 54. However, this backlight 72 also includes an adjustable collimator 64, which is positioned between the optical light guide 54 and the display surface 24, and which is configured to align the light 22 toward the display surface 42 with a collimation angle of the light 24 emitted by the at least one lamp, where the collimation angle is adjustable between a zero-degree collimation angle (e.g., no focusing or narrowing) and a nonzero-degree collimation angle (e.g., significant focusing and/or narrowing) inversely proportional to a collimation magnitude. For example, in embodiments where the adjustable collimator 64 is implemented as an electrowetting electrode, the backlight 72 may also include a light angle selector 46 that is configured to apply to the electrowetting electrode an electrowetting voltage selected from various electrowetting voltages respectively producing a collimation angle. In some such embodiments, at least three electrowetting voltages may be selectable in order to achieve a selectable range of collimation magnitudes and corresponding viewing angles 18 of the visual presentation 14. This configuration of the backlight 72 thereby achieves the emission and guidance of light 22 toward the display surface 42 with a variable viewing angle 18, based on the inclusion and activation of the adjustable collimator 64 with a desired collimation magnitude.

Figure 6:
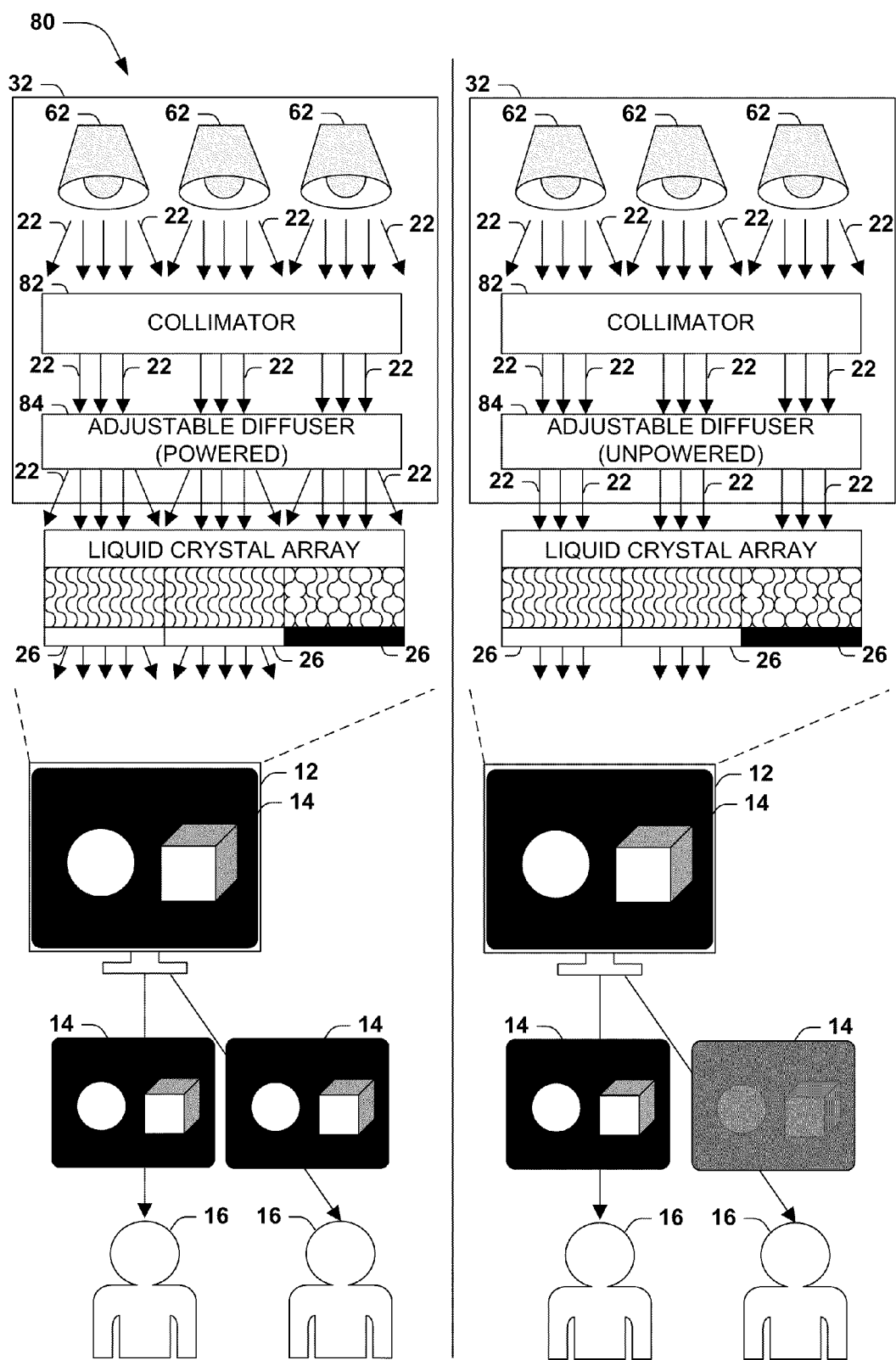
FIG. 6 is an illustration of a third exemplary backlight configured to confer an adjustable viewing angle upon a display in accordance with the techniques presented herein.

FIG. 6 presents an exemplary scenario 80 featuring a third embodiment of these techniques, featuring a backlight 32 including a set of lamps 62 that may be powered to distribute light 22 at many angles toward the display surface 24. This backlight 32 also includes a collimator 82 (either adjustable, as in the exemplary scenario 60 of FIG. 4, or non-adjustable) that (variably or constantly) focuses and/or narrows the light 22 emitted by the lamps 62 upon the display surface 24. However, this backlight 32 also features an adjustable diffuser 84, which is positioned between the collimator 82 and the display surface 24 and configured to diffuse the light 22 proportional to a diffuser voltage applied to the adjustable diffuser. As a first example, the adjustable diffuser 84 may comprise a polymer-dispersed liquid crystal (PDLC) positioned in the path of the beam of light 22 that is ordinarily transparent, but that, when electrically activated, operate as a Fresnel lens to cause a diffusing refractive effect upon the light 22 resulting in wider distribution across the display surface 24. As a second example, the adjustable diffuser 84 may comprise a polymer-stabilized cholesteric texture, comprising molecular structures that are ordinarily aligned to produce a transparent appearance, but that, upon electrical activation, form a different orientation and/or shape that causes broader diffusion of light 22 across the display surface 24.

In these and other embodiments, the adjustable diffuser 84 may be unpowered to cause the light 22 focused and/or narrowed by the collimator 82 to pass through to the display surface 24 in order to achieve a narrow display angle 18 of the visual presentation 14, or may be powered to cause the light 22 to diffuse more broadly across the display surface 24 in order to achieve a wide viewing angle 18 of the visual presentation 14. Accordingly, in a first state of this embodiment (illustrated in the left half of FIG. 6), the adjustable diffuser 84, positioned along the path of light 22 between the collimator 82 and the display surface 24, is powered, and the angles of the light 22 passing therethrough is more widely distributed across the display surface 24. The embodiment in this state may achieve a wide range of viewing angles 18 (such that a first user 16 positioned at a zero-degree viewing angle 18 with respect to the center of the display 12 perceives the visual presentation 14 of similar quality to a second user 16 positioned at a nonzero-degree viewing angle 18 with respect to the center of the display 12.) By contrast, in a second state (illustrated in the right half of FIG. 6), the adjustable diffuser 84 is unpowered, such that the light 22 remains collimated and is presented in a focused and/or narrowed beam upon the display surface 24. The light 22 may therefore pass through the display surface 22 predominantly at a zero-degree angle, and may achieve a narrow range of viewing angles 18 (such that a first user 16 positioned at a zero-degree viewing angle 18 with respect to the center of the display 12 perceives the visual presentation 14 of significantly higher quality than a second user 16 positioned at a nonzero-degree viewing angle 18 with respect to the center of the display 12.)

Figure 7:
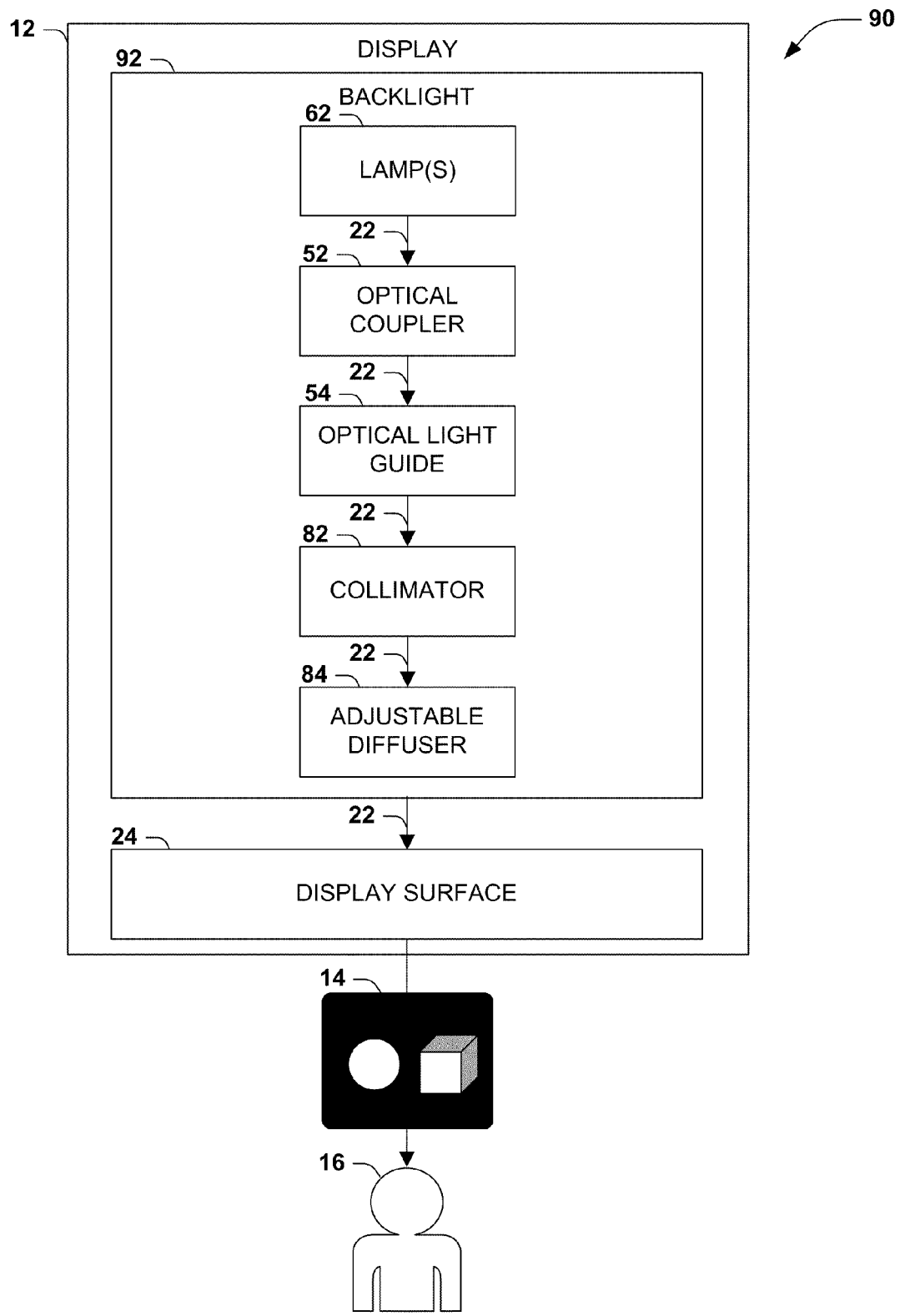
FIG. 7 is a component block diagram of the third exemplary backlight illustrated in FIG. 6.

FIG. 7 presents a component block diagram 90 of the exemplary third embodiment of these techniques illustrated in FIG. 6. In this component block diagram 90, the exemplary third embodiment comprises a backlight 92 operating within a display 12 having a display surface 42, in order to produce a visual presentation 14 to be rendered for at least one user 16. The backlight 92 comprises at least one lamp 62 configured to emit light 22 at many angles directed toward the display surface 42. The backlight 92 also comprises an optical coupler 52, which is positioned between at least one lamp and the display surface 42 and is configured to couple the light 22 with the display surface 42 (e.g., by reducing the transitions between media that may cause undesirable diffraction of the light 22), and an optical light guide 54, which is positioned between at least one lamp and the display surface 42 and which is configured to distribute the light 22 across the display surface 54. This backlight 92 also includes a collimator 82, which is positioned between the optical light guide 54 and the display surface 24, and which is configured to (adjustably or non-adjustably) align the light 22 toward the display surface 42 with a collimation angle of the light 24 emitted by the at least one lamp 62. However, this backlight 92 also includes an adjustable diffuser 84, positioned between the collimator 82 and the display surface 24, which is configured to diffuse the light 24 proportional to a diffuser voltage applied to the adjustable diffuser. The adjustable diffuser 84 may comprise, e.g., a polymer-dispersed liquid crystal (PDLC) material, and/or a polymer-stabilized cholesteric texture (PSCT) material. Moreover, the backlight 92 may also include a light angle selector 46 that is configured to apply to the adjustable diffuser 84 a diffuser voltage, which may be selected from various diffuser voltages respectively producing a diffusion angle. In some such embodiments, at least three diffuser voltages may be selectable in order to achieve a selectable range of diffusion magnitudes and corresponding viewing angles 18 of the visual presentation 14. This configuration of the backlight 92 thereby achieves the emission and guidance of light 22 toward the display surface 42 with a variable viewing angle 18, based on the inclusion and activation of the adjustable diffuser 84 with a desired diffusion magnitude.

The foregoing presentation of three embodiments (respectively illustrated in FIGS. 2-3, 4-5, and 6-7) present a few components that may achieve an adjustable viewing angle 18 according to the techniques presented herein. It may be appreciated that other techniques may be utilized to generate an adjustable viewing angle 18. Alternatively or additionally, a combination of components may be included in a backlight of a display 12; e.g., a display 12 may include a backlight that includes two or more banks of lamps 62 generating light 24 with different beam angles, an adjustable collimator 64, and an adjustable diffuser 84, all of which may be operated in order to achieve a broad range of selectable viewing angles 18 in accordance with the techniques presented herein.

Additional variations of these techniques relate to other components that may be included in various embodiments to confer additional advantages and/or reduce disadvantages thereof. As a first variation, some embodiments of these techniques may implement the display surface 24 as a twisted nematic (TN) liquid crystal display, comprising an array of liquid crystals having a twisted shape, such that light 22 having a first polarity is rotated while passing through the array to a second polarity. However, electrical activation of an area of liquid crystals may alter the degree of twisting to lead to a degree of polarity of the transmitted light 22 different than the second polarity. The front edge of the display surface 24 may then include a second polarizer that passes only light having the desired second polarity, thereby improving the contrast between the transmission of light 22 through electrically deactivated areas and the blocking of light 22 through electrically activated areas of the twisted nematic liquid crystal array. In accordance with this first variation, a backlight configured according to the techniques presented herein may include a forward polarizer, which may be positioned between at least one lamp 62 and the adjustable collimator 64 and may be configured to transmit light 22 having a light polarity approximately equal to a desired light polarity. In non-reflective polarizers, light 22 not having the desired polarity may be absorbed, thereby causing a loss of efficiency and/or an undesirable absorption of heat by the polarizer. However, in other embodiments, the forward polarizer may comprise a reflective forward polarizer, which also reflects backwardly any light 22 having a light polarity not approximately equal to a desired light polarity (e.g., the first polarity of light 22 desirably entering the twisted nematic liquid crystal array.) Light 22 not having the correct polarity may be reflected backward and may reflect through the enclosed structure of the backlight, and such reflections may alter the polarity of the light 22. Accordingly, the reflected light 22 may have the desired polarity upon encounter the reflective forward polarizer a second time, and may therefore pass through to the display surface 24.

Figure 8:
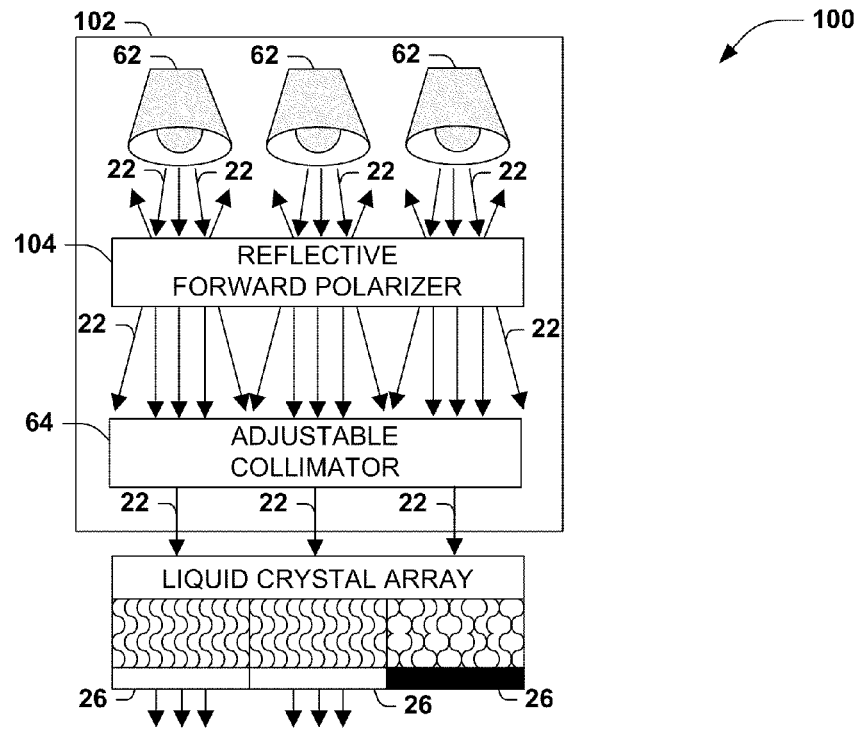
FIG. 8 is an illustration of an exemplary scenario featuring a backlight having an adjustable viewing angle and a reflective forward polarizer.

FIG. 8 presents an exemplary scenario 100 featuring a backlight 102 having a reflective forward polarizer 104. In this exemplary scenario 100, the lamps 62 of the backlight 102 emit light 22 toward the display surface 24, and the display angle 18 of the visual presentation 14 is adjusted by positioning between the lamps 62 and the display surface 24 an adjustable collimator 64 (in a similar manner as in the exemplary scenario 60 of FIG. 4.) However, this backlight 102 also features a reflective forward polarizer 104, positioned between the lamps 62 and the adjustable collimator 64, which selectively transmits light 22 having a desired polarity and reflects light 22 having a different polarity. The reflective forward polarizer 104 may comprise, e.g., a wire grid polarizer, or an interference reflector composed of a biaxial film. The reflected light 22 rebounds throughout the enclosed component of the backlight 102, and such reflections may alter the polarity of the reflected light 22, such that the light 22 may have the desired polarity upon again encountering the reflective forward polarizer 104. The inclusion of the reflective forward polarizer 104 may therefore promote the "recycling" of the light 22 emitted by the lamps 62 of the backlight 102, thereby improving the efficient transmission of light 22 with a correct polarity to the adjustable collimator 64, which may permit the backlight to generate a visual presentation 14 of an equivalent power (such as brightness) at a lower power in order to extend the battery life of the device.

As a second variation, some embodiments of these techniques may position one or more lamps 62 along a side of a backlight and/or display 12. This configuration may be advantageous, e.g., for reducing the profile of the display 12. Although the lamps 62 may be oriented to emit light 22 laterally (e.g., parallel with the display surface 24), the optical light guide 54 may redirect the light 22 to a perpendicular direction, and may diffuse or distribute the emitted light 22 consistently across the display surface 24. However, the orientation of the lamps 62 may not be fully focused upon the optical light guide 54, and a portion of the emitted light 22 may instead contact other interior surfaces of the display 12, thereby causing a loss of efficiency (due to unused light 22) and/or an undesirable absorption of heat by the surfaces of the display 12. In order to reduce these effects, embodiments of these techniques may include a back reflector, which may be positioned around at least one lamp 62 and configured to reflect light 22 toward the display surface 24.

Figure 9:
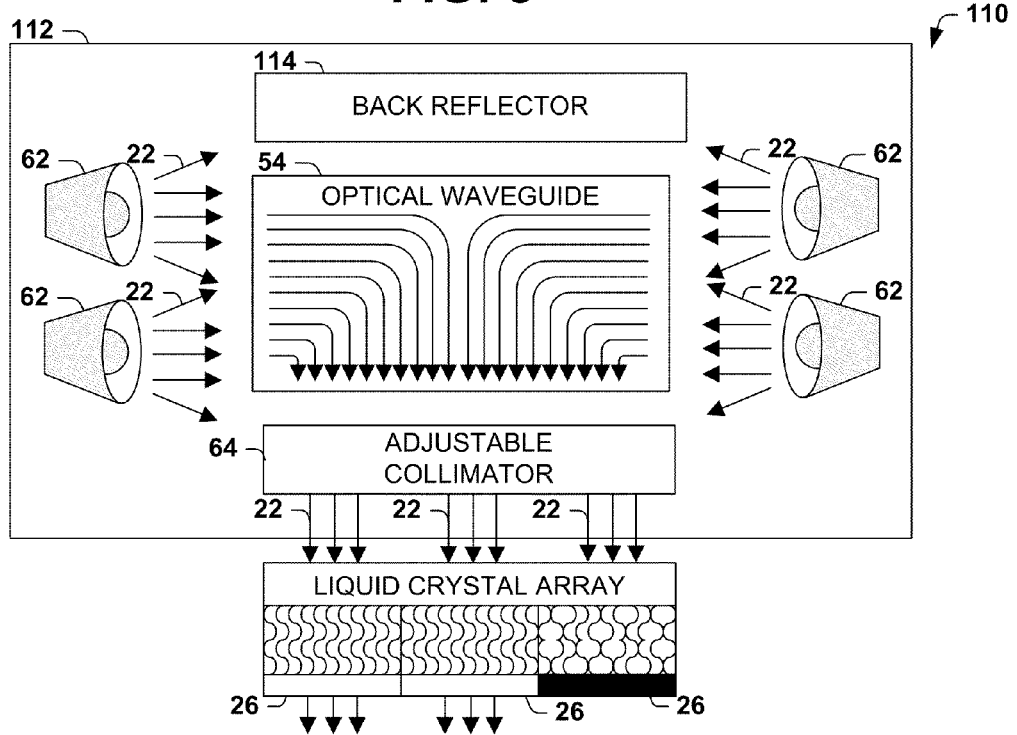
FIG. 9 is an illustration of an exemplary scenario featuring a backlight having an adjustable viewing angle and a back reflector.

FIG. 9 presents an exemplary scenario 110 featuring a backlight 112 having two banks of lamps 62 positioned at lateral edges of the backlight 112. Light 22 emitted in a substantially lateral direction may enter the optical light guide 54, and may be directed through an adjustable collimator 64 to impart an adjustable display angle 18 before being directed upon a display surface 24. However, some light 22 may be emitted from the lamps 62 at a different angle, and may not enter the optical light guide 54. In order to reduce the loss of such light 22 and/or the undesirable absorption and accompanying temperature rise by the interior structures of the backlight 112, the backlight 112 may feature a back reflector 114 positioned behind the optical light guide 54 and configured to reflect light 22 back toward the optical light guide 54. In this manner, light recycling may be promoted to improve the energy efficiency of the backlight 102 in a manner compatible with the adjustable viewing angle 18 achieved according to the techniques presented herein. For example, the back reflectors may surround at least a portion of a lamp 62 and/or may be positioned on at least one interior surface of the backlight in order to redirect emitted light 22 that does not initially enter the optical light guide 54, thereby improving light recycling. Those of ordinary skill in the art may devise many configurations including additional components that add various features to the backlight 102 and/or the display 12 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
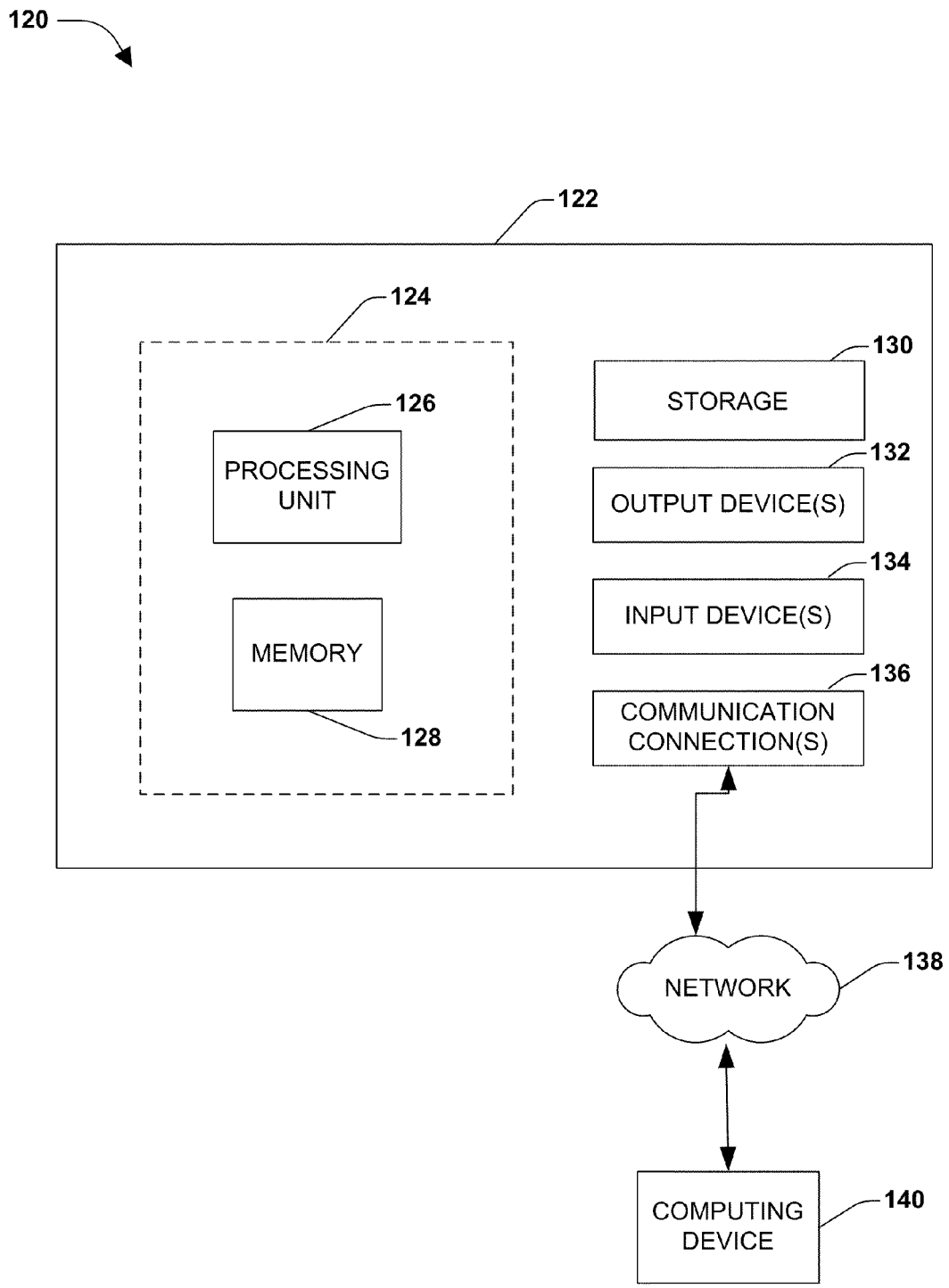
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 120 comprising a computing device 122 configured to implement one or more embodiments provided herein. In one configuration, computing device 122 includes at least one processing unit 126 and memory 128. Depending on the exact configuration and type of computing device, memory 128 may be volatile (such as RAM, for example), non-volatile (such as ROM, flash memory, etc., for example) or some combination of the two. This configuration is illustrated in FIG. 10 by dashed line 124.

In other embodiments, device 122 may include additional features and/or functionality. For example, device 122 may also include additional storage (e.g., removable and/or non-removable) including, but not limited to, magnetic storage, optical storage, and the like. Such additional storage is illustrated in FIG. 10 by storage 130. In one embodiment, computer readable instructions to implement one or more embodiments provided herein may be in storage 130. Storage 130 may also store other computer readable instructions to implement an operating system, an application program, and the like. Computer readable instructions may be loaded in memory 128 for execution by processing unit 126, for example.

The term "computer readable media" as used herein includes computer storage media. Computer storage media includes volatile and nonvolatile, removable and non-removable media implemented in any method or technology for storage of information such as computer readable instructions or other data. Memory 128 and storage 130 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 122. Any such computer storage media may be part of device 122.

Device 122 may also include communication connection(s) 136 that allows device 122 to communicate with other devices. Communication connection(s) 136 may include, but is not limited to, a modem, a Network Interface Card (NIC), an integrated network interface, a radio frequency transmitter/receiver, an infrared port, a USB connection, or other interfaces for connecting computing device 122 to other computing devices. Communication connection(s) 136 may include a wired connection or a wireless connection. Communication connection(s) 136 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 122 may include input device(s) 134 such as keyboard, mouse, pen, voice input device, touch input device, infrared cameras, video input devices, and/or any other input device. Output device(s) 132 such as one or more displays, speakers, printers, and/or any other output device may also be included in device 122. Input device(s) 134 and output device(s) 132 may be connected to device 122 via a wired connection, wireless connection, or any combination thereof. In one embodiment, an input device or an output device from another computing device may be used as input device(s) 134 or output device(s) 132 for computing device 122.

Components of computing device 122 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 122 may be interconnected by a network. For example, memory 128 may be comprised of multiple physical memory units located in different physical locations interconnected by a network.

Those skilled in the art will realize that storage devices utilized to store computer readable instructions may be distributed across a network. For example, a computing device 140 accessible via network 138 may store computer readable instructions to implement one or more embodiments provided herein. Computing device 122 may access computing device 140 and download a part or all of the computer readable instructions for execution. Alternatively, computing device 122 may download pieces of the computer readable instructions, as needed, or some instructions may be executed at computing device 122 and some at computing device 140.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A backlight for a display surface providing an adjustable viewing angle of light emitted by the display surface that is selectable by a user, the backlight comprising:
   at least one wide-beam lamp configured to emit light at a wide angle directed toward the display surface;
   at least one narrow-beam lamp configured to emit light at a narrow angle directed toward the display surface, wherein the narrow angle is less than the wide angle;
   a light angle selector having a wide viewing angle setting and a narrow viewing angle setting, for setting a viewing angle of the light emitted by the display surface, and configured to:
   power the at least one wide-beam lamp in response to a selection by the user of the wide viewing angle setting while leaving the at least one narrow beam lamp unpowered, and
   power the at least one narrow-beam lamp in responses to a selection by the user of the narrow viewing angle setting while leaving the at least one wide-beam lamp unpowered;
   an optical coupler positioned between at least one lamp and the display surface and configured to couple the light with the display surface; and
   an optical light guide positioned between at least one lamp and the display surface and configured to distribute the light across the display surface.

2. The backlight of claim 1:
   the backlight comprising at least one moderate-beam lamp configured to emit light at an angle less than the wide angle of the wide-beam lamp and greater than the narrow angle of the narrow-beam lamp; and the light angle selector configured to activate one of the at least one wide-beam lamp, the at least one moderate-beam lamp, and the at least one narrow-beam lamp.

3. The backlight of claim 1, further comprising: a forward polarizer positioned between at least one lamp and the display surface and configured to transmit light having a light polarity approximately equal to a desired light polarity.

4. The backlight of claim 3, the forward polarizer comprising a reflective forward polarizer configured to reflect backwardly light having a light polarity not approximately equal to a desired light polarity.

5. The backlight of claim 4, the reflective forward polarizer comprising a wire grid polarizer.

6. The backlight of claim 4, the reflective forward polarizer comprising an interference reflector composed of a biaxial film.

7. The backlight of claim 1, further comprising: a back reflector positioned around at least one lamp and configured to reflect light toward the display surface.

8. A backlight for a display surface providing an adjustable viewing angle of light emitted by the display surface that is selectable by a user, comprising:
at least one lamp configured to emit light;
an optical coupler positioned between the at least one lamp and the display surface and configured to couple the light with the display surface;
an optical light guide positioned between the at least one lamp and the display surface and configured to distribute the light across the display surface; and
an adjustable collimator positioned between the optical light guide and the display surface and configured to, responsive to a selection by the user of a selected adjustable viewing angle setting of the light emitted by the display surface, align the light toward the display surface with a collimation angle of the light emitted by the at least one lamp, the collimation angle adjustable between a zero-degree collimation angle and a nonzero-degree collimation angle inversely proportional to a collimation magnitude according to the selected viewing angle setting selected by the user; and
an adjustable diffuser positioned between the collimator and the display surface and configured to diffuse the light proportional to a diffuser voltage applied to the adjustable diffuser.

9. The backlight of claim 8, the adjustable collimator comprising an electrowetting electrode providing an adjustable collimation angle proportional to an electrowetting voltage applied to the electrowetting electrode.

10. The backlight of claim 9, further comprising: a light angle selector configured to apply to the electrowetting electrode an electrowetting voltage selected from at least three electrowetting voltages respectively producing a collimation angle.

11. The backlight of claim 8, the adjustable collimator configured to align the light toward the display surface with a collimation angle less than an angle of light emitted by the optical light guide.

12. The backlight of claim 11, the adjustable diffuser comprising a polymer-dispersed liquid crystal.

13. The backlight of claim 11, the adjustable diffuser comprising a polymer-stabilized cholesteric texture.

14. The backlight of claim 11, further comprising: a light angle selector configured to apply to the adjustable diffuser a diffuser voltage selected from at least three diffuser voltages respectively producing a collimation angle.

15. The backlight of claim 8, further comprising: a forward polarizer positioned between at least one lamp and the display surface and configured to transmit light having a light polarity approximately equal to a desired light polarity.

16. The backlight of claim 15, the forward polarizer comprising a reflective forward polarizer configured to reflect backwardly light having a light polarity not approximately equal to a desired light polarity.

17. The backlight of claim 16, the reflective forward polarizer comprising a wire grid polarizer.

18. The backlight of claim 16, the reflective forward polarizer comprising an interference reflector composed of a biaxial film.

19. The backlight of claim 8, further comprising: a back reflector positioned around at least one lamp and configured to reflect light toward the display surface.

20. An electronic device comprising a backlight for a display surface providing an adjustable viewing angle of light emitted by the display surface that is selectable by a user, the backlight comprising:
at least one wide-beam lamp configured to emit light at a wide angle;
at least one narrow-beam lamp configured to emit light at a narrow angle directed toward the display surface;
at least one first light angle selector having a wide viewing angle setting and a narrow viewing angle setting, for setting a viewing angle of light emitted by the display surface, and configured to power:
the at least one wide-beam lamp responsive to a selection by the user of the wide viewing angle setting of the light emitted by the display surface, while leaving the at least one narrow beam lamp unpowered; and
the at least one narrow-beam lamp responsive to a selection by the user of the narrow viewing angle setting of the light emitted by the display surface while leaving the at least one wide-beam lamp unpowered;
an optical coupler positioned between at least one lamp and the display surface and configured to couple the light with the display surface;
a solid optical light guide positioned between at least one of the at least one wide-beam lamp and the at least one narrow-beam lamp and the display surface and configured to distribute the light across the display surface;
an adjustable collimator positioned between the optical light guide and the display surface and configured to align the light toward the display surface with a collimation angle of the light emitted by the at least one of the at least one wide-beam lamp and the at least one narrow-beam lamp, the collimation angle adjustable between a zero-degree collimation angle and a nonzero-degree collimation angle inversely proportional to a collimation magnitude, the adjustable collimator comprising an electrowetting electrode providing an adjustable collimation angle proportional to an electrowetting voltage applied to the electrowetting electrode according to a selected viewing angle setting received from the user;
a second light angle selector configured to apply to the electrowetting electrode an electrowetting voltage selected according to the selected viewing angle setting from at least three electrowetting voltages respectively producing a collimation angle;
an adjustable diffuser positioned between the collimator and the display surface and configured to diffuse the light proportional to a diffuser voltage applied to the adjustable diffuser, the adjustable diffuser selected from a set of adjustable diffusers comprising:
a polymer-dispersed liquid crystal, and
a polymer-stabilized cholesteric texture;

a third light angle selector configured to apply to the adjustable diffuser a diffuser voltage selected from at least three diffuser voltages respectively producing a collimation angle, where the diffuser voltage is selected according to the selected viewing angle setting received from the user;

a forward polarizer positioned between at least one lamp and the display surface and configured to transmit light having a light polarity approximately equal to a desired light polarity according to the selected viewing angle setting received from the user, the forward polarizer comprising a reflective forward polarizer configured to reflect backwardly light having a light polarity not approximately equal to a desired light polarity, and the forward polarizer selected from a set of forward polarizers comprising:

a wire grid polarizer, and an interference reflector composed of a biaxial film; and a back reflector positioned around at least one lamp and configured to reflect light toward the display surface.

* * * * *